United States Patent
Seppänen

(10) Patent No.: US 6,841,100 B2
(45) Date of Patent: Jan. 11, 2005

(54) METHOD FOR CASTING A CONCRETE PRODUCT

(75) Inventor: Aimo Seppänen, Sääksmäki (FI)

(73) Assignee: Consolis Technology Oy AB, Vantaa (FI)

( * ) Notice: Subject to any disclaimer, the term of this patent is extended or adjusted under 35 U.S.C. 154(b) by 0 days.

(21) Appl. No.: 10/659,287

(22) Filed: Sep. 11, 2003

(65) Prior Publication Data

US 2004/0051193 A1 Mar. 18, 2004

(30) Foreign Application Priority Data

Sep. 16, 2002 (FI) .............................. 20021649

(51) Int. Cl.[7] .............................. B28B 1/26; B28B 7/08; B28B 3/22; B29C 47/92; B29C 39/44
(52) U.S. Cl. ..................... 264/33; 264/35; 264/40.1; 264/40.4; 264/40.5; 264/70; 264/209.1; 264/211.11; 425/64; 425/114; 425/141; 425/147; 425/150
(58) Field of Search ................ 264/33, 35, 70, 264/209.1, 211.11, 40.1, 40.4, 40.5; 425/64, 114, 141, 147, 150

(56) References Cited

U.S. PATENT DOCUMENTS

| 3,212,127 A | * | 10/1965 | Flook, Jr. et al. ........... 425/141 |
| 3,792,133 A | * | 2/1974 | Goughnour ................... 264/33 |
| 4,022,556 A | * | 5/1977 | Goetjen ........................ 425/64 |
| 4,202,658 A | * | 5/1980 | Ahonen ........................ 425/64 |
| 4,723,900 A |   | 2/1988 | Vuorenoja ................... 425/204 |
| 4,773,838 A | * | 9/1988 | Seppanen ..................... 425/63 |
| 5,023,030 A | * | 6/1991 | Rantanen .................... 264/40.5 |
| 5,198,235 A | * | 3/1993 | Reichstein et al. ........... 425/62 |
| 5,618,476 A | * | 4/1997 | Mogel ........................ 264/40.1 |

FOREIGN PATENT DOCUMENTS

| EP | 0 517 505 A1 | 12/1992 |
| FI | 48902 | 11/1975 |
| FI | 76514 | 7/1989 |
| FI | 19991792 | 2/2001 |

* cited by examiner

Primary Examiner—Michael P. Colaianni
Assistant Examiner—Michael I. Poe
(74) Attorney, Agent, or Firm—Burns, Doane, Swecker & Mathis, LLP

(57) ABSTRACT

A method is disclosed for casting a concrete product, in which method the concrete product is cast in an essentially horizontal slipform casting process during which the top surface height and profile of the concrete product being cast is measured continually. Based on the measurement results, the relative proportion of the concrete mix flowing to the upper layer or lower layer of the concrete product is controlled by way of moving or tilting a feed trough (12) located below the concrete mix feed means (2).

12 Claims, 2 Drawing Sheets

METHOD FOR CASTING A CONCRETE PRODUCT

This application claims priority under 35 U.S.C. §§ 119 and/or 365 to Application No. 20021649 filed in Finland on Sep. 16, 2002; the entire content of which is hereby incorporated by reference.

FIELD OF THE INVENTION

The present invention relates to a method for making hollow-core concrete products by a slipform casting method, wherein the top surface quality of the product being cast is automatically controlled by adjusting the concrete mix feed trough of the slipform casting machine.

The invention also relates to a slipform casting machinery for making hollow-core concrete products, the machinery including an adjustable concrete mix feed trough and sensors capable of monitoring the quality of the top surface of the concrete product being manufactured.

BACKGROUND OF THE INVENTION

In an extruder-type slipform casting process, the concrete mix is extruded with the help of auger feeders into a mold or through nozzles, whereby the casting machine is propelled along the casting bed by the reaction forces imposed on the auger feeders. The ready-cast product remains on the casting bed. The quality of the manufactured concrete product is affected by the adjustments of the casting machine and degree of wear in its components. The compaction of the concrete product may be very thorough even when the top surface of the product remains short of its nominal height or has an undulating upper profile.

Patent publication FI 80,845, for instance, describes a concrete mix compaction method. This approach, however, lacks a technique capable of securing the true straightness and correct height of the top surface in the product being made. After a sufficiently large portion of the cross section in the concrete product has reached a satisfactory degree of compaction, the extrusion force exerted on the cross section of the product exceeds the travel resistance imposed on the machine making it to proceed. Herein, the top surface of the concrete product may remain filled under the nominal height or assume an undulating profile notwithstanding the acceptable degree of compaction.

In the casting machine, the concrete mix feed trough functions as a flow guide for the concrete mix so as to form a portion of the auger feeder casing, whereby the length of the trough can be adjusted so as to control the flow of the concrete mix into the cross section of the product being cast. Generally, the length of the concrete mix feed trough is set separately for each kind of concrete mix to be cast. Such an adjustment is made on a one-time basis without later correction. Disadvantageously, however, the flow of the concrete mix subjects the feed trough to a wear particularly at the downstream end thereof. The wear progresses rapidly so far as to affect the flow of the concrete mix and, thereby, the filling of the concrete product cross section. As soon as the top surface of the cast product is found to be defectively filled, the feed trough must be replaced or the worn portion thereof otherwise repaired.

SUMMARY OF THE INVENTION

In the present method, the straightness and height of the top surface of the concrete product being cast is measured during the slipform casting process. The concrete mix feed trough has guides and a position adjustment actuator attached thereto for automatic positioning of the feed trough. This arrangement makes it possible to adjust the feed trough so that the trough either feeds a greater or smaller amount of concrete mix to the top surface of the product being cast. In its simplest form, the feed trough adjustment takes place longitudinally in the center axis direction of the auger feeder. An individually adjustable feed trough is located under each one of the auger feeders.

The method according to the invention makes it possible to adjust the concrete mix flow automatically with the help of the feed trough in real time during the casting process so as to make the concrete product being cast compliant with the requirements set on the concrete product top surface as to its quality, straightness and height. Additionally, the method according to the invention reduces the need for feed trough repair/replacement and secures uniform casting quality of concrete product with a leveled top surface. At the occurrence of excessive extrusion, the feed trough can be adjusted so as to reduce the flow rate of concrete mix to the top surface region of the product being cast.

DESCRIPTION OF THE DRAWINGS

Next, the invention will be examined in greater detail by making reference to the attached drawings, wherein.

DETAILED DESCRIPTION OF THE EMBODIMENT

Figure 1:
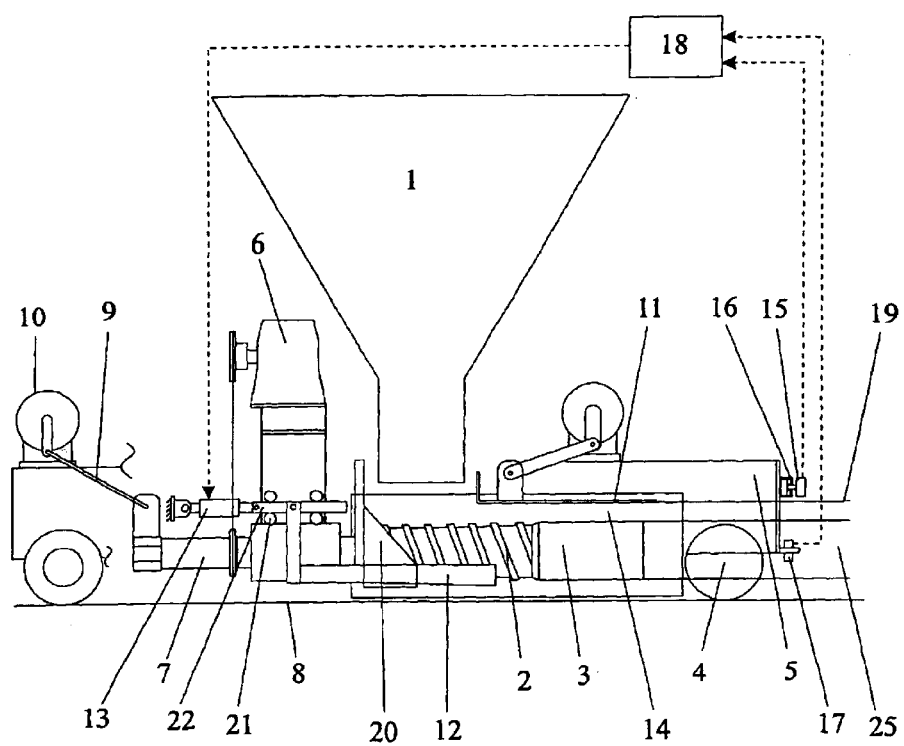
FIG. 1 shows a partially sectional view of a casting apparatus according to the invention.

Referring to FIG. 1, the apparatus according to the invention shown therein is an extruder-type slipform casting machine adapted to move on support wheels 4 along the side rails of a mold 8. The apparatus is assembled on a framework 5. In the illustrated exemplary embodiment, the casting machine is provided with one or more auger feeders 2, whereon concrete mix is fed from a hopper 1. The augers 2 are mounted on the framework 5 so as to be supported by rotary auger drive shafts 7 rotated by a drive motor 6. At the trailing end of the augers 2 are adapted core-shaping mandrels 3 serving to shape hollow cores in the concrete product 25 being cast. The auger drive shaft(s) 7 is/are connected by a crank mechanism rod 9 to a drive motor 10 of the compaction system. The closed cross section of the casting mold is defined at its upper surface by a top-side troweling beam 11, while side beams 14 define the sides of the mold. Under the auger feeder and partially at the sides thereof is located a concrete mix feed trough 12 adapted to have its position in the direction of the longitudinal axis of the auger feeder adjustable by means of an actuator 13. The feed trough is supported by a support bracket 20 and a guide 22. The guide 22 itself is supported by support rolls 21. The height level and straightness of concrete product top surface 19 is monitored by means of a level sensor 15 adapted on a guide rail 16. The level sensor 15 is actuated into a reciprocating movement during casting, whereby it is capable of measuring the product height dimension across the entire top surface of the product and possible depressions therein. A control unit 18 compares the height level measurement values with the nominal product height preset in the control unit prior to casting. If the control unit detects deviations in the measured product height from the preset nominal value, the control unit adjusts as necessary the position of the concrete mix feed trough 12 in relation to the downstream end of the auger feeder. Possible elevation of the casting machine frame from the casting bed due to excessive extrusion pressure is detected by a sensor 17, whereby such an elevation is taken into account in the control signals issued by the control unit 18 to the actuator 13 of the feed trough.

If control unit 18 during casting receives from level sensor 15 a signal indicating that the top-surface height 19 at a hollow-core portion of the product tends to remain lower than the preset nominal height of the product, the control program of control unit 18 steers the feed trough 12 to be moved with the help of actuator 13 further upstream in regard to the auger feeder 2. Hereby, the relative portion of concrete mix flow to the lower layer of concrete product 25 is reduced and, respectively, increased to the top-surface layer of the product. As a result, the increased flow rate of concrete mix also imposes a higher extrusion pressure in the upper layer of the concrete product thus filling the depression on the top surface of the product. Respectively, if the top surface of the product is detected to be excessively high, the control program of the control unit steers the feed trough to be moved downstream in regard to the auger feeder, whereby the relative amount of the concrete mix flow on the top surface of the product is decreased, the extrusion pressure in the direction of the product top surface is diminished and the product top surface height is lowered.

Compensation of wear at the downstream delivery end of the feed trough may also be effected by adjusting the length of feed trough 12 and the stroke length of actuator 13. For this purpose, the control unit can also adjust the position of the feed trough downstream of the auger feeder thus compensating for a change in the relative portion of concrete mix flow due to wear in the feed trough. This facility increases in a substantial fashion the change intervals of feed troughs necessary due to wear.

Actuator 13 may be electrically or hydraulically powered, whereby in the latter case also a hydraulic unit is needed to deliver pressurized hydraulic fluid.

Figure 2:
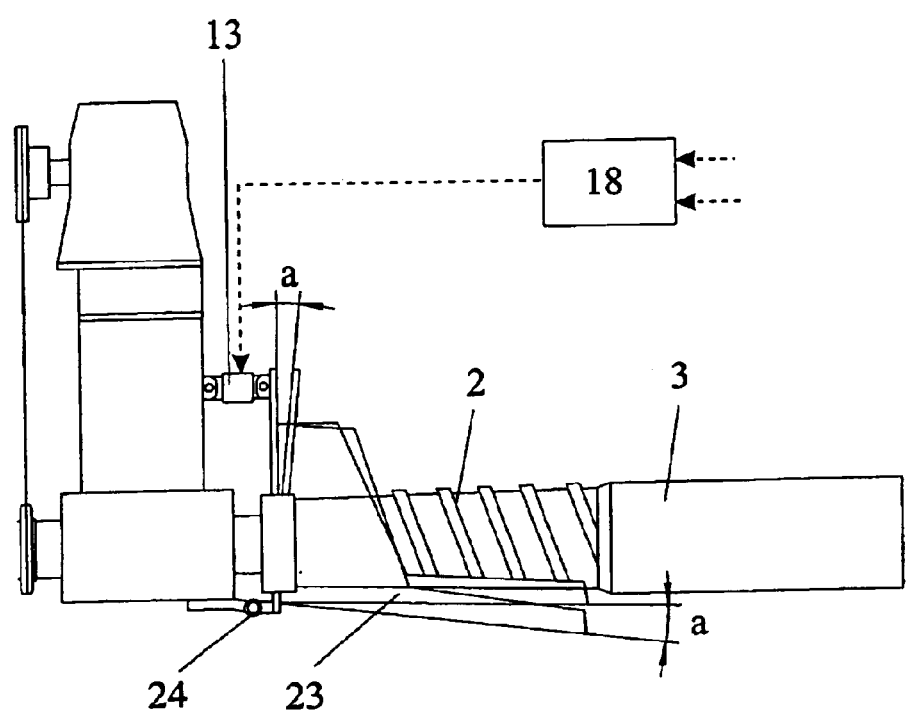
FIG. 2 shows an alternative embodiment of the invention for adjusting a concrete mix feed trough.

In the alternative embodiment of the invention shown in FIG. 2, the adjustment of the feed trough is realized by arranging the feed trough 23 to be supported by a hinged support 24. Then, based on the adjustment need decided by control unit 18, the angle α of feed trough 23 in regard to the longitudinal axis of auger feeder 2 is changed with the help of actuator 13.

If control unit 18 receives from level sensor 15 a signal indicating that the top surface height of the product tends to remain lower than the preset nominal height of the product, the angle α is adjusted smaller, whereby the relative portion of the concrete mix flow to the lower layer of concrete product 25 is reduced and, respectively, increased to the top surface layer of the product. As a result, the increased flow rate of concrete mix also imposes a higher extrusion pressure in the upper layer of the concrete product thus filling the depression on the top surface of the product. Respectively, if the top surface of the product is detected to be excessively high, the control program of the control unit steers the tilt angle α of the feed trough toward a steeper position, whereby the relative proportion of the concrete mix flowing to the top layer of the product is decreased, the extrusion pressure in the direction of the product top surface is diminished and the product top surface height is lowered.

The invention is not limited as to the use of a specific type of level sensor capable of measuring the top-surface height of a concrete product, but rather, may be effected in conjunction with any kind of sensor capable of submitting such measurement information as is required in the position control of a concrete mix feed trough.

What is claimed is:

1. A method for fabricating a hollow-core concrete slab product in a substantially horizontal slipform casting process, in which method a concrete mix is fed into a slipforming mold of a defined cross section moving progressively in the casting process so as to give the concrete slab product a desired shape, the method comprising the steps of:

measuring a top surface height and profile of the concrete slab product and, on the basis of the measurement results, controlling relative proportion of the concrete mix flowing to an upper layer or, respectively, to a lower layer of the concrete slab product by means of moving or tilting, during the casting process, a feed trough located below a feed means.

2. The method of claim 1, wherein a position of said feed trough is adjusted on the basis of the measurement results indicating possible under/overthickness of the concrete slab product.

3. The method of claim 1, wherein the position of said feed trough is adjusted on the basis of the measurement results indicating possible depressions in a top surface of the concrete slab product along its longitudinal direction.

4. The method of claim 3, wherein a position of said feed trough is adjusted on the basis of the measurement results indicating possible under/overthickness of the concrete slab product.

5. The method of claim 1, further comprising the steps of, on the basis of the measurement results, correcting the top surface height of the concrete slab product of insufficient thickness by increasing the relative proportion of the concrete mix flowing to the upper layer of the concrete slab product by way of moving said feed trough further in a downstream direction of said feed means.

6. The method of claim 5, wherein a position of said feed trough is adjusted on the basis of the measurement results indicating possible under/overthickness of the concrete slab product.

7. The method of claim 5, wherein a position of said feed trough is adjusted on the basis of the measurement results indicating possible depressions in a top surface of the concrete slab product along its longitudinal direction.

8. The method of claim 7, wherein a position of said feed trough is adjusted on the basis of the measurement results indicating possible under/overthickness of the concrete slab product.

9. The method of claim 1, further comprising the step of, on the basis of the measurement results, correcting the top surface height of the concrete slab product of excessive thickness by decreasing the relative proportion of the concrete mix flowing to the upper layer of the concrete slab product by way of moving said feed trough in an upstream direction of said feed means.

10. The method of claim 9, wherein a position of said feed trough is adjusted on the basis of the measurement results indicating possible under/overthickness of the concrete slab product.

11. The method of claim 9, wherein a position of said feed trough is adjusted on the basis of the measurement results indicating possible depressions in a top surface of the concrete slab product along its longitudinal direction.

12. The method of claim 11, wherein a position of said feed trough is adjusted on the basis of the measurement results indicating possible under/overthickness of the concrete slab product.

* * * * *